Aug. 20, 1940.  R. O. HELGEBY  2,212,232
ELECTRIC SPEEDOMETER
Filed May 22, 1939
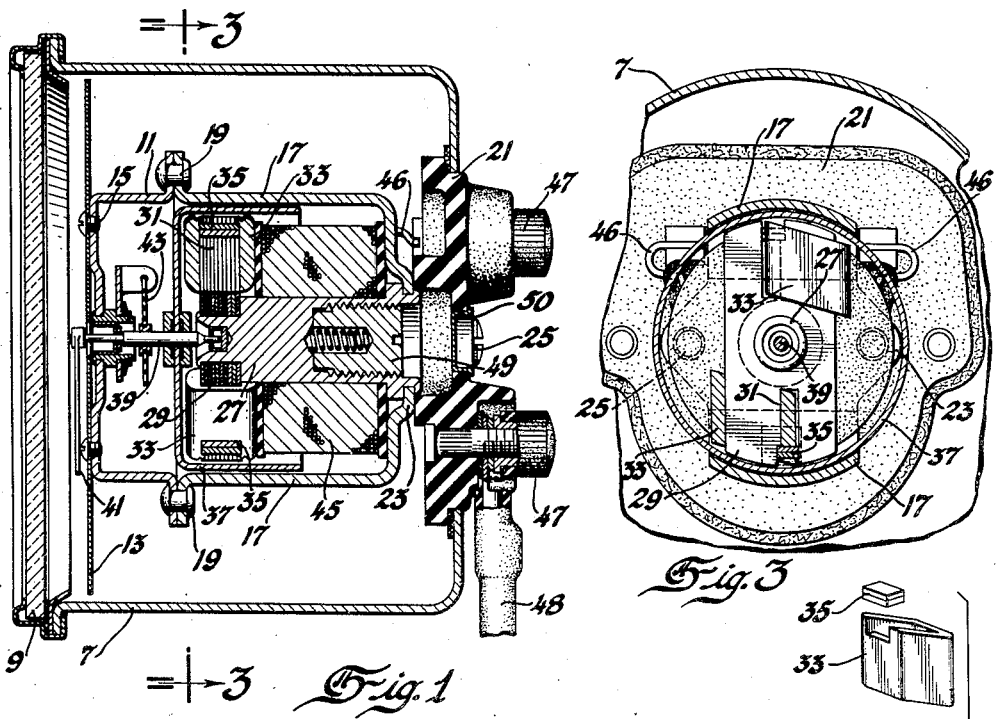
Fig. 1
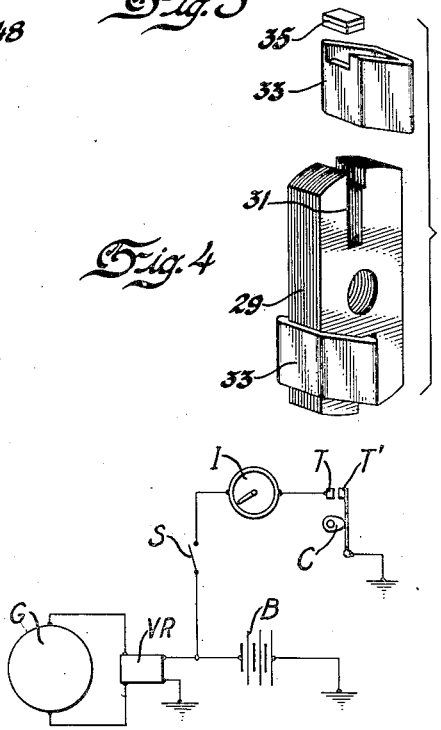
Fig. 3
Fig. 4
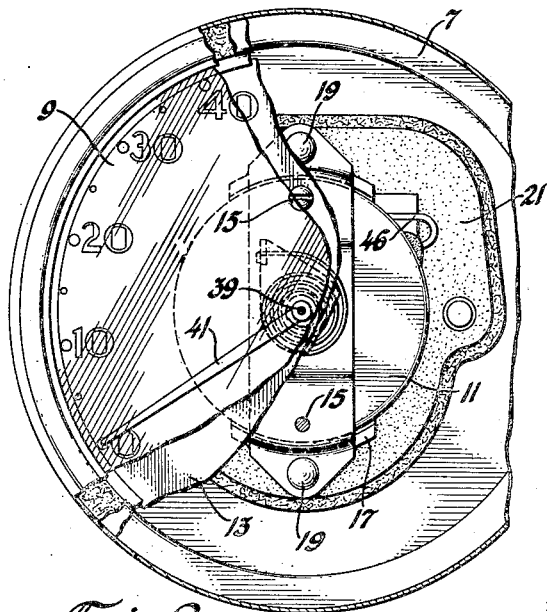
Fig. 2
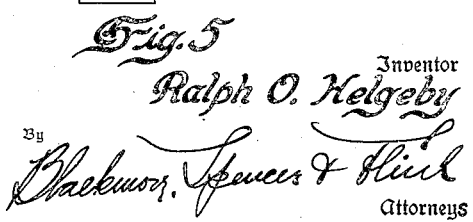
Fig. 5
Inventor
Ralph O. Helgeby
By
Blackmore, Spencer & Hirl
Attorneys Patented Aug. 20, 1940

2,212,232

UNITED STATES PATENT OFFICE 2,212,232

ELECTRIC SPEEDOMETER

Ralph O. Helgeby, Flint, Mich., assignor to General Motors Corporation, Detroit, Mich., a corporation of Delaware Application May 22, 1939, Serial No. 274,984

9 Claims. (Cl. 175—183)

This invention relates to an improved tachometer or measuring instrument. It is intended more particularly for use on vehicles and when so used it may be more aptly referred to as a speedometer.

An object of the invention is to provide an instrument which shall indicate the speed of a moving member or the rate of rotation of a rotatable member and do so without the use of a driving cable between the instrument and the member, the movement of which is to be measured.

Another object is to provide for the operation of a tachometer or speedometer by electrical means which shall measure the frequency of current interruption which frequency is itself a measure of the rate of movement of the member, the speed of which is to be made known by the instrument.

Other objects will be understood from the description which follows.

On the drawing:

Figure 1 is a transverse section through the measuring instrument.

Figure 2 is a view in elevation, partly broken away.

Figure 3 is a section as seen from line 3—3 of Figure 1.

Figure 4 is a view of parts shown in perspective.

Figure 5 is a wiring diagram.

The instrument includes a casing 7 having a front glass cover 9. Within the casing is a cup shaped stamping 11 having a dial 13 provided with figures which are visible through the cover. The dial plate is secured to the stamping 11 by screws 15. Field pieces 17 extend from diametrically opposite parts of stamping 11 and are secured thereto by rivets 19. Fitted within the back of the casing is an insulating disc 21. The field pieces 17 are integral with and extend from a plate 23 which is secured to disc 21 by fastening means 25. A cylindrical core 27 is fixedly carried by plate 23 and extends forwardly therefrom between the field pieces 17. At the front end of the core there is a reduced portion upon which are mounted laminated pole pieces 29. These pole pieces are slotted at 31 at each end to receive shading coils 33 which may be of copper or the like. Outwardly from these shading coils there are temperature compensators 35 of well-known material located in the slots. A speed cup 37 of aluminum or the like has its skirt portion received between the field pieces 17 and the ends of the laminated poles. To the speed cup is secured a spindle 39 which is journaled at one end in the end of the core and at the other end in the stamping 11. The spindle carries a pointer 41 which is biased to point toward the zero on the dial by a suitably anchored hair spring 43. Coil 45 is wound about the core 27 and its ends 46 are carried by terminal studs beneath caps as at 47. The two wires from the coil extend from the instrument within a protective cover 48. To vary the strength of the field there may be employed a soft iron screw 49 adapted to be threaded to a variable extent into the core. Access to this screw may be had from the rear of the instrument by removing a cap 50.

When the instrument is used for a vehicle, the wiring diagram may be substantially that shown by Figure 5. Vehicles generally have as sources of electric energy, a battery and a generator. In the diagram, the generator is marked G and the battery B. A voltage regulator for which no novelty per se is herein claimed, is marked VR. The leads between the generator and voltage regulator are shown on the drawing as is also the ground connection for the latter. The instrument giving the readings is marked I. It is connected with a lead between the generator and battery, there being shown a switch marked S. The return lead from the instrument to the ground is controlled by an interrupter. The interrupter may take the form of terminals TT' adapted to engage and to be separated by the action of a cam C which is being rotated by any convenient driving connection with a shaft driven by the engine of the motor vehicle. By the means described, an interrupted current passes through the coil of the instrument, the frequency of the interruptions varying with the speed of the vehicle. The magnetic flux from the poles through the speed cup to the field pieces is so influenced by the shading coils as to produce a rotating magnetic field which varies in intensity in accordance with the frequency of the interruptions in the current with the result that the frequency of interruptions, varying with the speed of the vehicle, determines the position of the pointer in its relation to the figures on the dial. This action is occasioned by the fact that when the current is interrupted the unshaded part of each pole will lose its electro-magnetic force before the shaded part, thereby setting up a magnetic sweep from the unshaded part to the shaded part. This tends to pull the speed cup around by means of the eddy currents which are set up in the speed cup. By adjusting the screw 49, the instrument can be easily calibrated.

In the use of such an instrument as a vehicle speedometer it will probably be desirable to record the mileage travelled. For that purpose suitable means, such for example, as an electro-magnet responsive to the same interrupted current, may be used to operate the conventional odometer mechanism. No such odometer operating device is herein shown as it is not a part of this invention.

I claim:

1. A movable member, mechanism to visibly register the rate of movement of said member, said mechanism including an instrument having an electro-magnet with shaded poles and a rotary eddy current indicating member, and means to supply an electric current to said electro-magnet together with a device intermittently interrupting said current, the rate of movement of said member determining the frequency of said interruptions.

2. Speed registering mechanism for vehicles comprising a source of electric current, means to interrupt said current with frequencies varying with and in response to changes in the speed of the vehicle, said mechanism also including an instrument having as a part thereof an electro-magnet with shaded poles, said electro-magnet being subject to the influence of said interrupted current and an eddy current indicating member rotatable in response to the magnetic sweep between the unshaded and the shaded parts of said poles.

3. The invention defined by claim 2, said instrument having field pieces positioned adjacent said poles, and said eddy current indicating member having a skirt portion between said field pieces and said poles.

4. A speedometer for vehicles, said speedometer having a casing, an electro-magnet fixed to said casing, said electro-magnet having shaded poles, fixed field pieces adjacent said poles, a speed cup having a skirt portion extending between said poles and field pieces, a pointer carried by said speed cup, a fixed dial having indicia thereon, means supplying an electric current to said electro-magnet, and means driven by said vehicle to intermittently interrupt said current.

5. The invention defined by claim 4, said electro-magnet having a core and means adjustable therein to vary the strength of the magnetic field.

6. A speedometer for vehicles, said speedometer having a casing, an electro-magnet fixed to said casing, said electro-magnet having shaded poles, fixed field pieces adjacent said poles, a speed cup having a skirt portion extending between said poles and field pieces, a pointer carried by said speed cup, a fixed dial having indicia thereon whereby the interruptions of an interrupted current passing through said electro-magnet, which interruptions may vary in response to changes in vehicle speed, may be measured.

7. The invention defined by claim 6, said electro-magnet having a core and means adjustable therein to vary the strength of the magnetic field.

8. An electric speedometer for vehicles, said speedometer having a wound core, pole pieces carried by said core, said pole pieces having terminal slots, shading coils mounted in said slots, fixed field pieces adjacent said pole piece terminals, a rotatable speed cup having a skirt portion extending between the pole piece terminals and said field pieces, a pointer carried by said speed cup, a fixed dial having indicia thereon to cooperate with said pointer.

9. The invention defined by claim 8, said pole pieces being of laminated form and temperature compensators also mounted in the slots of said pole pieces.

RALPH O. HELGEBY.